United States Patent
Wang et al.

(10) Patent No.: US 11,249,252 B2
(45) Date of Patent: Feb. 15, 2022

(54) FLEXIBLE SPLICE PROTECTOR

(71) Applicant: CommScope Technologies LLC, Hickory, NC (US)

(72) Inventors: Chi Ming Wang, Glen Ellyn, IL (US); David J. Smentek, Lockport, IL (US); Ibrahim M. Elnatour, Orland Park, IL (US); John Marty, Barrington, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/069,324

(22) Filed: Oct. 13, 2020

(65) Prior Publication Data
US 2021/0116661 A1  Apr. 22, 2021

Related U.S. Application Data

(60) Provisional application No. 62/924,258, filed on Oct. 22, 2019.

(51) Int. Cl.
*G02B 6/255* (2006.01)
*G02B 6/44* (2006.01)

(52) U.S. Cl.
CPC ......... *G02B 6/2558* (2013.01); *G02B 6/4403* (2013.01); *G02B 6/4478* (2013.01); *G02B 6/4432* (2013.01)

(58) Field of Classification Search
None
See application file for complete search history.

(56) References Cited

U.S. PATENT DOCUMENTS

| 6,454,471 B1 | 9/2002 | Ware et al. |
| 2017/0114854 A1 | 4/2017 | Howard et al. |
| 2017/0235063 A1 | 8/2017 | Ahmed et al. |
| 2019/0025516 A1 | 1/2019 | Lichoulas et al. |

FOREIGN PATENT DOCUMENTS

WO  2018175123 A1  9/2018

OTHER PUBLICATIONS

"International Search Report and Written Opinion corresponding to International Application No. PCT/US2020/055352 dated Feb. 9, 2021".

*Primary Examiner* — Jerry Rahll
(74) *Attorney, Agent, or Firm* — Myers Bigel, P.A.

(57) ABSTRACT

A fiber optic cable splice assembly includes: a first fiber optic cable having a first optical fiber with an exposed first exposed splice region, a first ribbon portion adjacent the first optical fiber and a first jacket; a second fiber optic cable having a second optical fiber with an exposed second splice region, a second ribbon portion adjacent the second optical fiber and a second jacket, the second optical fiber fusion-spliced to the first optical fiber; a splice protector that overlies the first and second exposed splice regions; and a first fiber boot attached to the splice protector that overlies the first ribbon portion.

17 Claims, 4 Drawing Sheets

FLEXIBLE SPLICE PROTECTOR

RELATED APPLICATION

The present application claims priority from and the benefit of U.S. Provisional Patent Application No. 62/924,258, filed Oct. 22, 2019, the disclosure of which is hereby incorporated herein by reference in its entirety.

FIELD OF THE INVENTION

The present invention relates generally to spliced cable and/or spliced fiber protectors.

BACKGROUND OF THE INVENTION

As shown in FIG. 1, a multi-fiber fusion spliced cable may have five distinct segments: a first cable portion 102, a first fiber ribbon portion 104 (in which the jacket of the cable is stripped away), a fusion splice (which is shown in FIG. 1 as being encompassed by a splice protector 106), a second fiber ribbon portion 108 (again, in which the jacket of the cable is stripped away), and a second cable portion 110. A fusion splice is typically protected by a splice protector (like the splice protector 106) which is commonly a rigid sleeve that is formed to prevent bends from occurring near the vulnerable bare fiber and splice area. The splice protector 106 is typically formed of a heat-shrinkable material; once the fusion splice is completed, the splice protector 106 is slid into place and heat is applied, which shrinks the slice protector 106 onto the fusion splice to provide protection thereto.

Typically, the first and second ribbon portions 104, 108 may also benefit from a protective covering. In some cases, large splice trays are used to protect these ribbon portions.

It may be desirable to improve upon methods and devices offering sufficient protection for each segment of a multi-fiber fusion spliced cable while minimizing or reducing the size of the protected cable and, at the same time, offering maximum flexibility for routing the cable. In addition, extra protection may be desired due to outdoor field installation conditions (in some cases provided by a large housing). Therefore, a method and/or system that protects a fusion spliced cable from damage and/or kinking while also providing enough flexibility for routing may be desirable.

SUMMARY

As a first aspect, embodiments of the invention are directed to a fiber optic cable splice assembly. The assembly comprises: a first fiber optic cable having a first optical fiber with an exposed first exposed splice region, a first ribbon portion adjacent the first optical fiber and a first jacket; a second fiber optic cable having a second optical fiber with an exposed second splice region, a second ribbon portion adjacent the second optical fiber and a second jacket, the second optical fiber fusion-spliced to the first optical fiber; a splice protector that overlies the first and second exposed splice regions; and a first fiber boot attached to the splice protector that overlies the first ribbon portion.

As a second aspect, embodiments of the invention are directed to a fiber optic cable splice assembly, comprising: a first fiber optic cable having a first optical fiber with an exposed first exposed splice region, a first ribbon portion adjacent the first optical fiber and a first jacket; a second fiber optic cable having a second optical fiber with an exposed second splice region, a second ribbon portion adjacent the second optical fiber and a second jacket, the second optical fiber fusion-spliced to the first optical fiber; a splice protector that overlies the first and second exposed splice regions; a first sleeve that overlies the splice protector, the first ribbon portion, and the second ribbon portion; and a second sleeve that overlies the first sleeve.

As a third aspect, embodiments of the invention are directed to a method of preparing a fiber optic splice assembly, comprising the steps of:
  (a) providing a first fiber optic cable having a first optical fiber with an exposed first exposed splice region, a first ribbon portion adjacent the first optical fiber and a first jacket;
  (b) providing a second fiber optic cable having a second optical fiber with an exposed second splice region, a second ribbon portion adjacent the second optical fiber and a second jacket,
  (c) fusion splicing the second optical fiber to the first optical fiber; and
  (d) sliding a splice protection unit along the first cable, the splice protection unit including a splice protector and a fiber boot attached to the splice protector, to a position in which the splice protection unit overlies the first and second exposed splice regions and the fiber boot overlies the first ribbon portion.

As a fourth aspect, embodiments of the invention are directed to a method of preparing a fiber optic splice assembly, comprising the steps of:
  (a) providing a first fiber optic cable having a first optical fiber with an exposed first splice region, a first ribbon portion adjacent the first optical fiber and a first jacket;
  (b) providing a second fiber optic cable having a second optical fiber with an exposed second splice region, a second ribbon portion adjacent the second optical fiber and a second jacket,
  (c) fusion splicing the second optical fiber to the first optical fiber;
  (d) applying a splice protector to overlie the first and second exposed splice regions; and
  (e) sliding first and second sleeves along the first cable, to a position in which the first sleeve overlies the splice protector and the second sleeve overlies the first sleeve.

DETAILED DESCRIPTION

Figure 1:
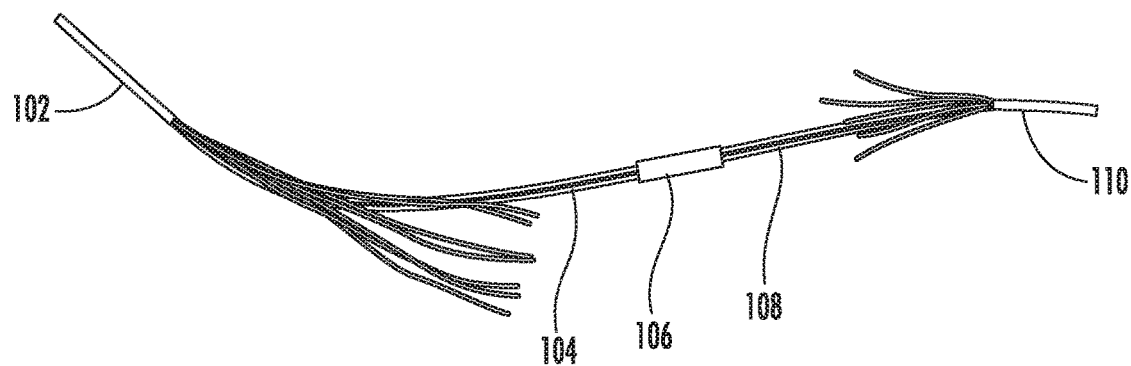
FIG. 1 is a top view of a fusion spliced fiber optic cable.

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Embodiments of the invention are directed to the protection of splices and ribbon portions adjacent splices as described above. In some embodiments, protection of the splice and one or both ribbon portions can be combined in a single step. First, this combination of steps can avoid instances in which breaks occur to the ribbon portions post-splicing and protection but before the addition of further protection. This adds to the robustness of the spliced area and increases throughput. Second, performing this combined step can also save time, thereby shortening cycle time. Third, such combination can also make the protection process easier to perform in the field or a warehouse. If the ribbon portions are short enough or if the combined step is performed in the right set of equipment, this can all be done on existing fusion splicing machines, which are already made to shrink protectors onto the splice. The conventional process is (a) splice, (b) protect, and (c) route in a protective enclosure and/or further protect. The flexibility proposed here would allow the use of fusion splicing in more applications while giving it adequate installation protection, and the use of a particular adhesive may make the spliced area watertight and weather-proof. The downside to a filled tube or a larger protective splice tray as used previously is that these are large and hard to fit in many areas. Materials used here could be tailored to allow use for multiple applications including outdoor, subterranean, aerial, or inside/routed in existing housings.

Figure 2:
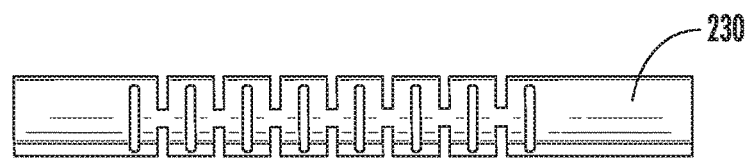
FIG. 2 is a top view of a fiber boot.
Figure 3:
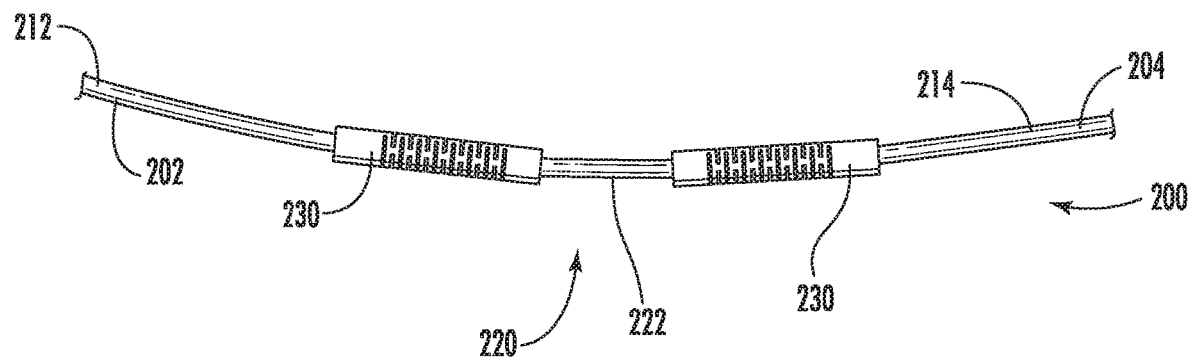
FIG. 3 is a top view of an assembly according to embodiments of the invention in which two fiber boots of FIG. 2 and a splice protector are employed to protect a splice.

Referring first to FIGS. 2 and 3, a fiber splice assembly 200 is shown therein. The assembly 200 includes two fiber optic cables 202, 204, each of which includes a respective optical fiber and ribbon portions (not visible in FIG. 3) and a respective jacket 212, 214. The assembly 200 further includes a splice unit 220 that includes a splice protector 222 (illustrated schematically in FIG. 3) and two fiber boots 230, one of which is shown in FIG. 2.

In some embodiments, the fiber boots 230 include one or more (e.g., two) reinforcing members, such as thin rods or wires. The material properties of the reinforcing members can help to dictate the degree of flexure of the fibers boots. The rods/wires may be sufficiently rigid to protect the "ribbon portions" adjacent the splice as described above, but sufficiently flexible to bend with the optical fibers. More specifically, a ribbon of fibers will preferentially bend in the axis perpendicular to the width of the ribbon. If bent in the axis parallel to the ribbon, issues can arise because the "inside fibers" of the bend will bend tighter than the "outside" fibers. In addition, the material of the reinforcing members may have some degree of memory, or may be malleable and maintain a curved or arced shape when bent. The reinforcing members may be formed of metal polymer, rubber, or other suitable materials. If two reinforcing members are employed, they may be arranged to permit bending in one direction by prevent bending in a second, orthogonal direction.

In addition, the fiber boots 230 may include anti-kink features, such as the cutouts visible in FIG. 2, to enable the fiber boots 230 to maintain their shape when bent. The anti-kink features may combine with the reinforcing members to provide preferential bending in one direction but reduced bending in the orthogonal direction. In some embodiments the cutouts may extend only partially into the surface of the boot 230 to ensure that the boot 230 is watertight.

The splice unit 220 is typically formed as a single unit (i.e., with the two fiber boots 230 attached to the splice protector 222). In such embodiments, the creation of the splice assembly 200 would typically proceed in the following manner. The splice unit 220 is inserted onto the fiber optic cable 202. The optical fibers of the cables 202, 204 are spliced. The splice unit 220 is then slid along the cable 202 until the spliced fibers reside within the protector 222, with the fiber boots 230 overlying the ribbon portions of the cables 202, 204. The splice unit 220 is then typically fixed in place with a fixing agent, which can comprise an adhesive, a heat shrink sleeve, or the like. A heat shrink sleeve may be a suitable choice of fixing agent when additional protection/sealing is desired (e.g., outdoor cables that may be exposed to UV radiation and/or water). In some embodiments, a small adhesive filled transition area may be included to capture any non-adhesive overlay, such as the boots (to make a watertight seal) or the sleeves. These may be desirable in some instances to create a cohesive member for sealing and for pull strength.

It should be noted that, although only a single optical fiber is described herein for each cable 202, 204, the splice unit 220 may be employed for multi-fiber cables, such as ribbon cables or loose tube fiber cables.

Also, in some embodiments, the splice unit 220 may be separated into subunits: one of which includes the splice protector 220 and one of the fiber boots 230, and the other of which includes only the other splice boot 230. This arrangement may be employed when the spliced fibers are larger in diameter than the inner surface of the fiber boot 230. As such, installation of the splice unit 220 involves the positioning of the splice protector 220 and attached fiber boot 230 on one cable to be spliced, and the other fiber boot 230 on the other cable. Once the fibers are spliced, the fiber boot/splice protector subunit is moved along its cable into a position in which the splice protector overlies the splice, and the free fiber boot 230 is moved along its cable into contact with the splice protector, where together they form the full splice unit 220. As another option, the assembly 200 may include a single fiber boot 230 that extends axially to cover the splice protector 220 and the ribbon portions of both cables 202, 204. As a further alternative, one or both fiber boots 230 may be overmolded over the splice protector 220 and ribbon portions (e.g., with a soft, flexible polymer) to provide protection.

Figure 4:
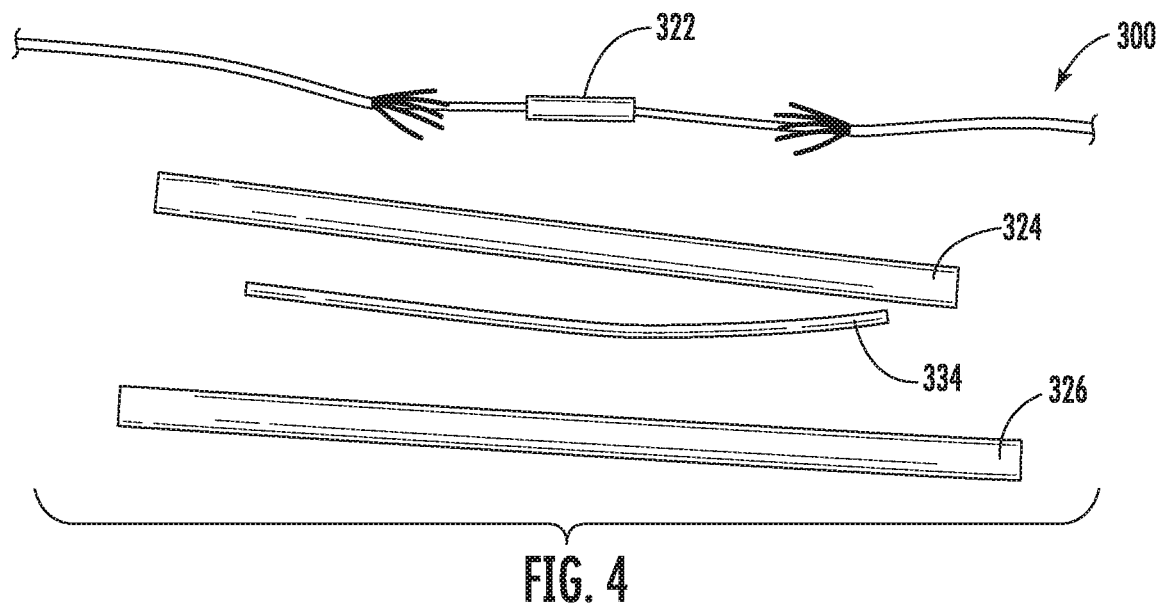
FIG. 4 is an exploded view of an assembly according to additional embodiments of the invention, in which two heat shrink sleeves and a thin rod are employed with a splice protector.
Figure 5:
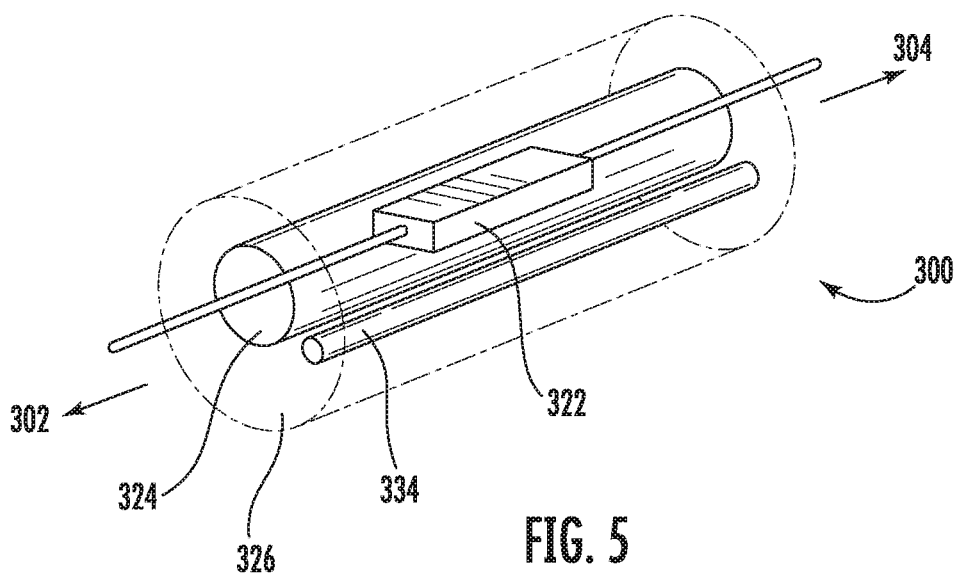
FIG. 5 is a schematic perspective view of the assembly of FIG. 4.

Another assembly, designated broadly at 300, is shown in FIGS. 4 and 5. The assembly 300 includes a splice protector 322, two heat shrink sleeves 324, 326, and at least one reinforcing member 334 such as a wire or rod. As can be seen in FIG. 5, the optical fibers of the cables 302, 304 are spliced and captured in and protected by the splice protector 322. The inner heat sleeve 324 overlies the splice protector 322 and the adjacent "ribbon portions" of the cables 302, 304. The outer heat sleeve 326 overlies the heat sleeve 324. The reinforcing member 334 is sandwiched between the inner and outer heat sleeves 324, 326. As discussed above, the reinforcing member 334 may be sufficiently rigid to protect the "ribbon portions" adjacent the splice as described above, but sufficiently flexible to bend with the optical fibers.

The assembly 300 can be prepared by inserting the heat shrink sleeves 324, 326 onto one of the cables 302, 304. The fibers of the cables 302, 304 are spliced, and the splice protector 322 is positioned over the splice. The heat shrink sleeves 324, 326 and the reinforcing member 334 are then slid into position overlying the splice protector 322 and ribbon portions of the cables 302, 304 and affixed to the cables 302, 304 via the application of heat.

In some embodiments, the inner heat sleeve 324 may be affixed over the splice protector 322 by itself, with the reinforcing member 334 subsequently being positioned over the inner heat sleeve 324 and the outer heat sleeve 326 positioned and affixed. In other embodiments, the reinforcing member 334 may be attached to either of the inner or outer heat sleeve 324, 326 prior to positioning and heating. In still other embodiments, the inner and outer heat shrink sleeves 324, 326 and the reinforcing member 334 may be provided as a single unit prior to being inserted onto one of the cables 302, 304. This embodiment has the potential to reduce labor considerably by providing a three-component unit that can simply be positioned over the spliced area and affixed in a single step.

In some embodiments, the inner sleeve 324 may be rigid, and the outer sleeve 326 may be a heat shrink sleeve, such that shrinkage of the outer sleeve 326 simultaneously locks the inner rigid sleeve 324, reinforcing member 334 and outer sleeve 326 in place on the cables 302, 304.

Figure 6:
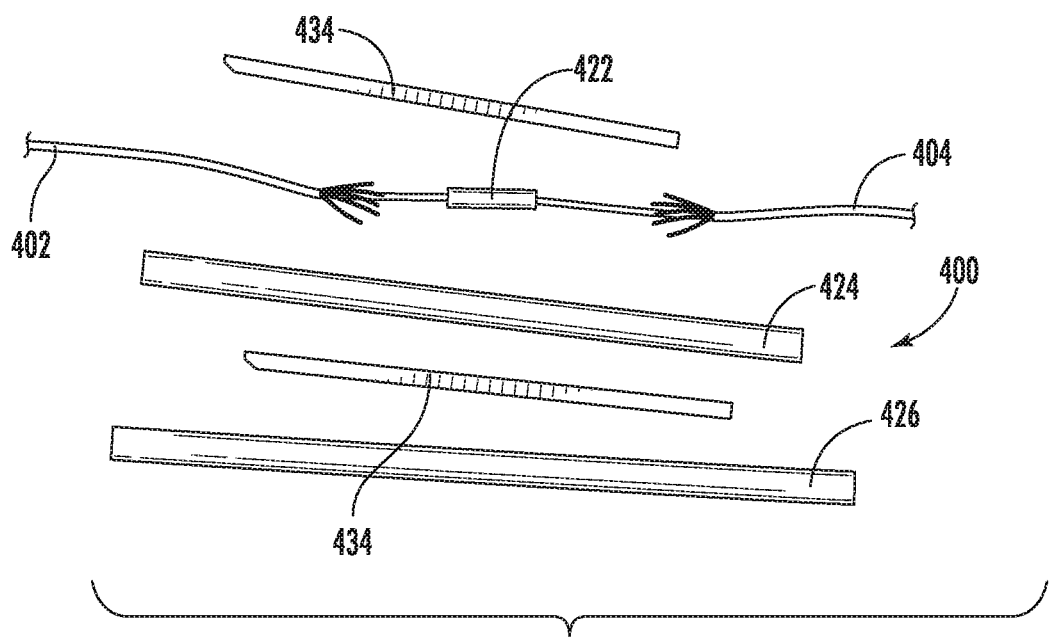
FIG. 6 is an exploded view of an assembly according to additional embodiments of the invention, in which two heat shrink sleeves and two thin plates are employed with a splice protector.
Figure 7:
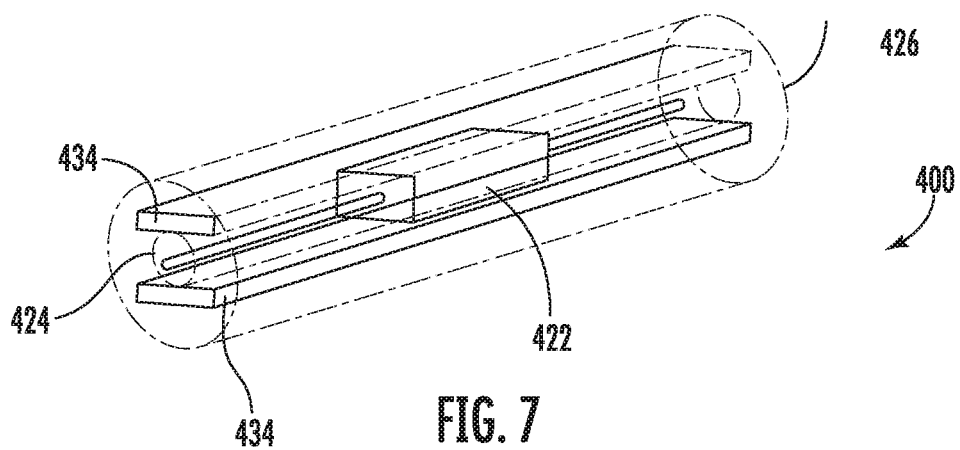
FIG. 7 is a schematic perspective view of the assembly of FIG. 6.

Referring now to FIGS. 6 and 7, another assembly, designated broadly at 400, is shown therein. The assembly 400 includes a splice protector 422, two heat shrink sleeves 424, 426, and at least one reinforcing plate 434 such as a bar or strip (two plates 434 are shown herein). As can be seen in FIG. 7, the optical fibers of the cables 402, 404 are spliced and captured in and protected by the splice protector 422. As described in connection with the assembly 300, the inner heat sleeve 424 overlies the splice protector 422 and the adjacent "ribbon portions" of the cables 402, 404. The outer heat sleeve 426 overlies the heat sleeve 424. The reinforcing plates 434 are sandwiched between the inner and outer heat sleeves 424, 426. As discussed above, the reinforcing plates 434 may be sufficiently rigid to protect the "ribbon portions" adjacent the splice as described above, but sufficiently flexible to bend with the optical fibers. Reinforcing plates 434 may be desirable in that they may permit bending in one direction (i.e., normal to the thickness of the plates 434) but prevent bending in another direction (i.e., parallel to the thickness of the plates 434).

The assembly 400 can be formed in the same manner as the assembly 300 described above, with the reinforcing plates 434 replacing the reinforcing members 334.

Figure 8:
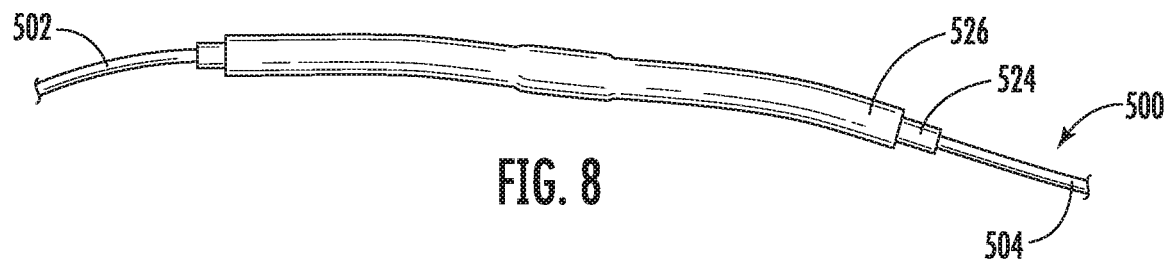
FIG. 8 is a top view of an assembly according to embodiments of the invention in which two heat shrink sleeves are employed with a splice protector.

Referring now to FIG. 8, another assembly, designated broadly at 500, is shown therein. The assembly 500 includes a splice protector (not visible in FIG. 8) and two heat shrink sleeves 524, 526, but unlike the assemblies 300, 400, the assembly 500 lacks a reinforcing member or plate. As described in connection with the assembly 300, the inner heat sleeve 524 overlies the splice protector 522 and the adjacent "ribbon portions" of the cables 502, 504, and the outer heat sleeve 526 overlies the heat sleeve 524. The thicknesses of the heat shrink sleeves 524, 526 may be selected to provide sufficient rigidity and integrity to the assembly 500 that no additional reinforcement is needed.

In other embodiments, the inner sleeve 524 may be a rigid tube (similar to a furcation tube) that protects the splice. The inner sleeve 524 would be held in place and protected by the outer heat shrink sleeve 526. The use of a rigid inner sleeve can prevent damage to the spliced area during shrinkage of the outer sleeve 526.

In addition, a rigid inner sleeve (such as the aforementioned furcation tube) may be employed with any of the method discussed above, particularly if adhesive is employed around the optical fibers. When this occurs, the fibers may be constrained by the adhesive in an undesirable manner. A rigid sleeve may enable the fibers to "float", thereby allowing them to flex without being constrained by the adhesive.

Figure 9:
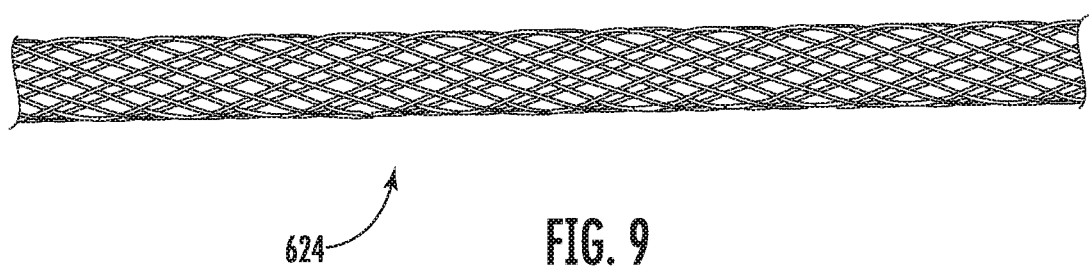
FIG. 9 is a top view of a "finger trap" that may be employed with a splice protector according to embodiments of the invention.

Referring now to FIG. 9, a sleeve 624 is shown therein. The sleeve 624 has the properties of a "finger trap," in which axial pulling forces at either end of the sleeve 624 cause the sleeve 624 to contract in diameter. Thus, the sleeve 624 may be employed in lieu of either or both of the inner and outer heat shrink sleeves discussed above for the various assemblies. In some embodiments, strength members may be woven into or otherwise associated with the sleeve 624 to provide additional strength and/or stiffness. The sleeve 624 may also serve as a foundation for other layers that may be applied over it, such as a heat shrink sleeve, an overmold, or adhesive. In such circumstances, the sleeve 624 can provide an underlying layer for attachment, serve to separate fibers/layers, and/or provide tensile strength. Also, the collapsibility of the he sleeve 624 may also be beneficial, as it can be stored in an expanded condition on the cable and easily slid into place and collapsed for use.

As another alternative, any of the sleeves discussed above may be replaced with a wrappable material, which can adhere to itself and thereby be fixed in place after it is wrapped. As a further alternative, any of the sleeves discussed above may have a "clamshell"-type configuration to be assembled by mating the clamshell halves.

In any of the embodiments discussed above, the spliced area may be enhanced with adhesive, a potting compound or the like, which can protect the spliced area. This material can be applied under or over the splice protector.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this That which is claimed is:

1. A fiber optic cable splice assembly, comprising:
   a first fiber optic cable having a first optical fiber with an exposed first exposed splice region, a first ribbon portion adjacent the first optical fiber and a first jacket;
   a second fiber optic cable having a second optical fiber with an exposed second splice region, a second ribbon portion adjacent the second optical fiber and a second jacket, the second optical fiber fusion-spliced to the first optical fiber;
   a splice protector that overlies the first and second exposed splice regions; and
   a first fiber boot attached to the splice protector that overlies the first ribbon portion and the splice protector.

2. The fiber optic splice assembly defined in claim 1, further comprising a second fiber boot attached to the splice protector that overlies the second ribbon portion.

3. The fiber optic splice assembly defined in claim 1, wherein the first fiber boot includes a first reinforcement member.

4. The fiber optic splice assembly defined in claim 3, wherein the first fiber boot comprises a second reinforcement member, the first and second reinforcement members being arranged such that the first ribbon portion is bendable in a first direction but resists bending in a second, orthogonal direction.

5. The fiber optic splice assembly defined in claim 1, wherein the first fiber boot further overlies the second ribbon portion.

6. A fiber optic cable splice assembly, comprising:
   a first fiber optic cable having a first optical fiber with an exposed first exposed splice region, a first ribbon portion adjacent the first optical fiber and a first jacket;
   a second fiber optic cable having a second optical fiber with an exposed second splice region, a second ribbon portion adjacent the second optical fiber and a second jacket, the second optical fiber fusion-spliced to the first optical fiber;
   a splice protector that overlies the first and second exposed splice regions; and
   a first sleeve that overlies the splice protector, the first ribbon portion, and the second ribbon portion; and
   a second sleeve that overlies the first sleeve;
   wherein one of the first or second sleeves has a clamshell configuration.

7. The fiber optic splice assembly defined in claim 6, further comprising a reinforcing member positioned between the first and second sleeves.

8. The fiber optic splice assembly defined in claim 7, wherein the reinforcing member is a reinforcing rod.

9. The fiber optic splice assembly defined in claim 7, wherein the reinforcing member is a reinforcing plate.

10. The fiber optic splice assembly defined in claim 7, wherein the reinforcing member is a first reinforcing member, and further comprising a second reinforcement member positioned between the first and second sleeves, the first and second reinforcement members being arranged such that the first ribbon portion is bendable in a first direction but resists bending in a second, orthogonal direction.

11. The fiber optic splice assembly defined in claim 6, wherein at least one of the first and second sleeves is a heat shrink sleeve.

12. The fiber optic splice assembly defined in claim 6, wherein one of the first or second sleeves comprises a configuration such that axial extension thereof causes radial contraction.

13. A method of preparing a fiber optic splice assembly, comprising the steps of:
   (a) providing a first fiber optic cable having a first optical fiber with an exposed first exposed splice region, a first ribbon portion adjacent the first optical fiber and a first jacket;
   (b) providing a second fiber optic cable having a second optical fiber with an exposed second splice region, a second ribbon portion adjacent the second optical fiber and a second jacket,
   (c) fusion splicing the second optical fiber to the first optical fiber; and
   (d) sliding a splice protection unit along the first cable, the splice protection unit including a splice protector and a fiber boot attached to the splice protector, to a position in which the splice protection unit overlies the first and second exposed splice regions and the fiber boot overlies the first ribbon portion.

14. The method defined in claim 13, wherein the splice protection unit further comprises a second fiber boot attached to the splice protector, and wherein step (d) further comprises sliding the splice protection unit so that the second fiber boot overlies the second ribbon portion.

15. The method defined in claim 13, further comprising (e) fixing the splice protection unit in place relative to the first and second cables.

16. The method defined in claim 13, wherein the first fiber boot includes a first reinforcement member.

17. The method defined in claim 16, wherein the first fiber boot comprises a second reinforcement member, the first and second reinforcement members being arranged such that the first ribbon portion is bendable in a first direction but resists bending in a second, orthogonal direction.

* * * * *